US008528315B2

(12) United States Patent
Smith et al.

(10) Patent No.: US 8,528,315 B2
(45) Date of Patent: Sep. 10, 2013

(54) AIR COOLING APPARATUS FOR A PURGE VALVE

(75) Inventors: David W. Smith, Simpsonville, SC (US); Doug Byrd, Greenville, SC (US); Michael P. Black, Clearwater, FL (US); Swapnil Tiwari, Bhopal (IN)

(73) Assignee: General Electric Company, Schenectady, NY (US)

( * ) Notice: Subject to any disclaimer, the term of this patent is extended or adjusted under 35 U.S.C. 154(b) by 864 days.

(21) Appl. No.: 12/289,573

(22) Filed: Oct. 30, 2008

(65) Prior Publication Data
US 2010/0107640 A1 May 6, 2010

(51) Int. Cl.
*F02C 7/12* (2006.01)

(52) U.S. Cl.
USPC .......... 60/39.83; 60/39.094; 137/382; 285/41

(58) Field of Classification Search
USPC .......... 60/39.094, 785, 39.83, 734; 137/338, 137/382, 382.5, 340; 123/541; 285/41
See application file for complete search history.

(56) References Cited

U.S. PATENT DOCUMENTS

| 2,732,227 | A | | 1/1956 | Kaiser |
| 2,785,697 | A | * | 3/1957 | Sullender et al. ............. 137/340 |
| 3,901,269 | A | | 8/1975 | Henderson |
| 3,973,585 | A | * | 8/1976 | Henderson .................... 137/340 |
| 4,017,102 | A | | 4/1977 | Henderson |
| 4,583,570 | A | * | 4/1986 | Rabe ............................. 137/340 |
| 6,050,081 | A | | 4/2000 | Jansen |
| 6,145,294 | A | | 11/2000 | Traver |
| 6,438,963 | B1 | | 8/2002 | Traver |
| 6,918,255 | B2 | | 7/2005 | Kaplan |
| 7,117,675 | B2 | * | 10/2006 | Kaplan et al. ................... 60/734 |
| 7,178,546 | B2 | * | 2/2007 | Gremillion, III .......... 137/15.01 |
| 7,527,068 | B2 | * | 5/2009 | Jansen .......................... 137/340 |
| 2005/0097880 | A1 | | 5/2005 | Jansen |

FOREIGN PATENT DOCUMENTS

| CN | 1526927 A | 9/2004 |
| DE | 8709109 U1 | 11/1987 |
| FR | 2531177 A | 5/2005 |
| GB | 2125940 | 3/1984 |

OTHER PUBLICATIONS

European Search Report dated Feb. 2, 2010 for Application No. EP 09174108.2, 8 pages.
Search Report from CN Application No. 200910208867.5 dated Mar. 25, 2013.

* cited by examiner

*Primary Examiner* — Gerald L Sung
*Assistant Examiner* — Michael B Mantyla
(74) *Attorney, Agent, or Firm* — Nixon & Vanderhye, P.C.

(57) ABSTRACT

A cooling enclosure for a valve includes an elongated housing body having a pair of housing portions and a pair of removable end plates, the pair of housing portions separable along at least one longitudinally-extending seam. Fastener devices are provided for securing the pair of housing portions engaged along the at least one longitudinal extending seam. One or more apertures are provided for accommodating a like number of valve fittings, and cooling air inlet and outlet openings are also provided in the housing body for supplying and removing cooling air to the housing body.

9 Claims, 3 Drawing Sheets

AIR COOLING APPARATUS FOR A PURGE VALVE

This invention relates to gas turbine technology generally, and to a system for cooling liquid fuel components subject to conduction and radiation heating, such as a three-way purge valve.

BACKGROUND OF THE INVENTION

Gas turbines typically operate on natural gas fuel, with fuel oil (typically no. 2 distillate) often used as a contingency for periods of gas unavailability. When a gas turbine is operating on natural gas fuel, the fuel oil typically remains in liquid fuel lines (for example, piping/tubing) leading to the combustor nozzles of the gas turbine. The stagnate fuel oil in a liquid fuel lines is often exposed to the turbine compartment air temperatures of up to 200° F., and turbine surfaces of up to 800° F.

Typically, a gas turbine has a number of combustors positioned around the turbine, each combustor having a gas fuel nozzle and liquid fuel nozzle. When the turbine is running on one type of fuel, the nozzle for the other type of fuel must be purged of the other type of fuel. Thus, for example, when a turbine is switched from running on fuel oil back to running on natural gas fuel, the fuel oil and the liquid fuel nozzle must be purged. Over time, this fuel nozzle, "purge air" fills some portion of the liquid fuel piping leading up to the liquid fuel nozzle as the level of fuel oil in the piping recedes due to leakage past upstream shut-off valves, and by thermal expansion and contraction with no make-up supply of liquid fuel. This air/oil interface on the coated surfaces of the piping system and valves (for example, check valves, ball valves, spool valves, purge valves, etc.) in the presence of the radiated, conducted and convected heat, leads to coke formation in the liquid fuel piping, resulting in flow restriction and inoperable valves. Eliminating any one of the three ingredients required for a coke formation (i.e., fuel oil, heat and air) will prevent coking. Since it not practical to eliminate fuel or air in a turbine, it would be beneficial to eliminate the heating of the liquid fuel lines, thereby resulting in the prevention of coking in the liquid fuel line piping and valves.

Prior attempts have been made to direct turbine compartment cooling air flow to the areas subject to coking, but sufficient temperature cooling could not be obtained. Typically, a combustor in the turbine operates at a temperature well over 2000° F. The heat from the combustor radiates towards compartments, such as the fuel, oil, piping and valves, sitting in the turbine enclosure. Even with attempts to ventilate the enclosure that included directing cooling air toward components subject to coking, air temperatures of 300° F. around such components was still typical.

There remains a need, therefore, for an efficient manner of cooling fuel components, and particularly gas turbine three-way purge valves, subject to high heat in the area of a gas turbine combustor.

BRIEF DESCRIPTION OF THE INVENTION

In one exemplary, but non-limiting embodiment, the present invention relates to a cooling enclosure for a valve comprising an elongated housing body having a pair of housing portions and a pair of removable end plates, the pair of housing portions separable along at least one longitudinally-extending seam; means for securing the pair of housing portions engaged along the at least one longitudinal extending seam; one or more apertures for accommodating a like number of valve fittings; and cooling air inlet and outlet openings in the housing body for supplying and removing cooling air to the housing body.

In another aspect, the invention relates to a cooling enclosure for a valve comprising a hollow open-ended housing body split into two half-housing portions along a pair of aligned seams, the two half-housing portions detachably secured to each other along the pair of aligned seams, and a pair of end plates removably secured to the housing body; a cooling air inlet in one of the pair of end plates and a cooling air outlet in the other of the pair of end plates; wherein at least one of the end plates is formed with a pair alignment tabs received within respective slots formed in the two half-housing portions, respectively.

In still another aspect, the invention relates to a system for cooling at least one gas turbine fuel component adapted for feeding liquid fuel to at least one combustor located in a high temperature environment to thereby eliminate coking in the at least one fuel component, the system comprising: a hollow open-ended housing body split into two half-housing portions along a pair of aligned seams, the two half-housing portions detachably secured to each other along the pair of aligned seams, and a pair of end plates removably secured to the housing body; a cooling air inlet in one of the pair of end plates and a cooling air outlet in the other of the pair of end plates, wherein at least one of the end plates is formed with a pair alignment tabs received within respective slots formed in the two half-housing portions, respectively; and a cooling air supply conduit connected to the cooling air inlet and a cooling air exhaust conduct connected to the cooling air outlet.

The invention will now be described in connection with the drawings identified below.

DETAILED DESCRIPTION OF THE INVENTION

Figure 1:
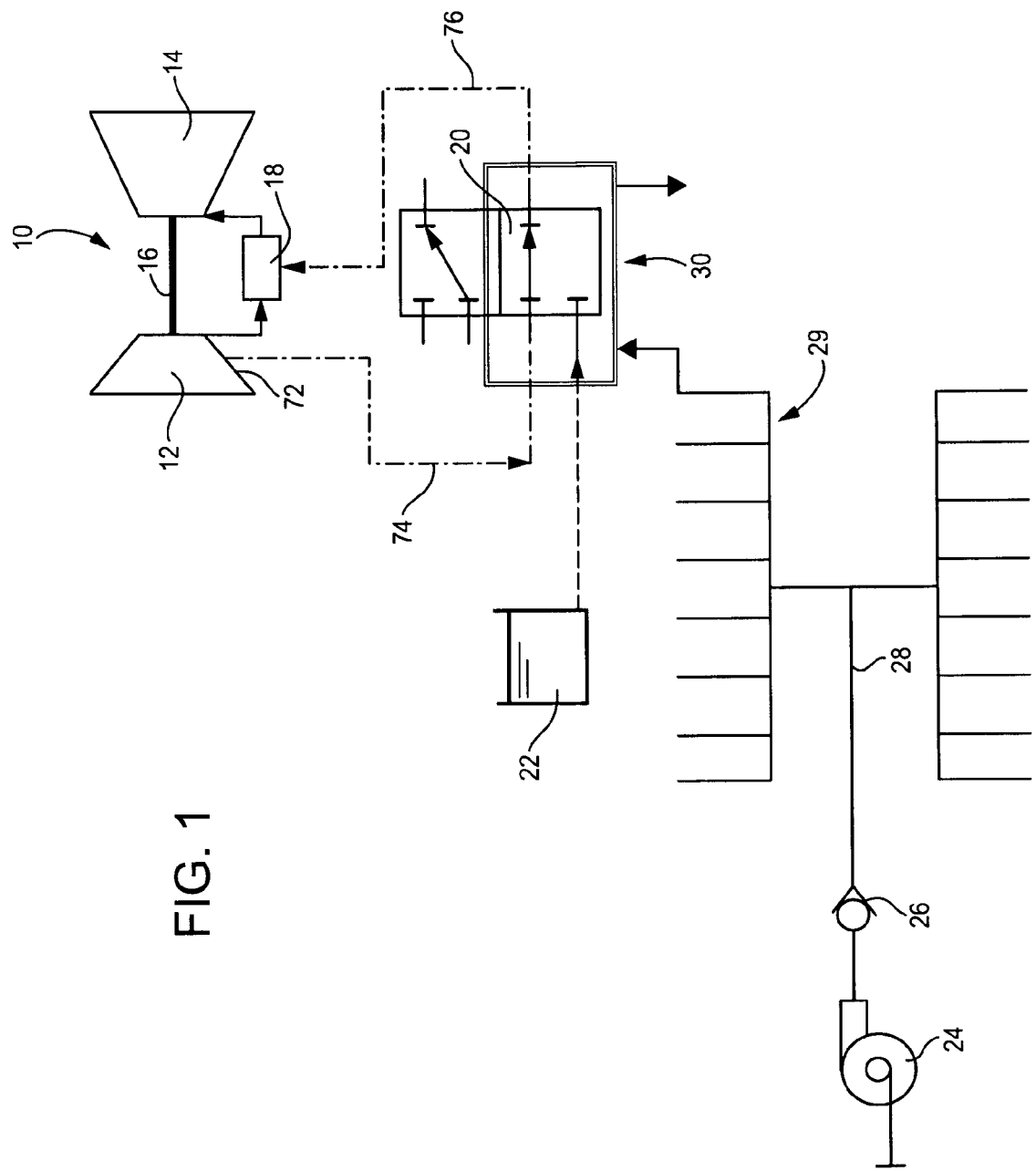
FIG. 1 is a schematic diagram of a gas turbine combustor and related fuel piping and valves, including a three-way purge valve.

With reference initially to FIG. 1, a gas turbine 10 typically includes a compressor 12 and a turbine 14 mounted on a single shaft 16. A combustor 18 is arranged to burn a fuel air mixture and to supply the hot gaseous products of combustion to the turbine 14. A three-way purge valve 20 is arranged to supply either liquid or purge to the combustor 18. Liquid fuel is supplied to the purge valve from a liquid fuel source 22 while purge air is supplied to the valve 20 by means of a blower 24, a check valve 26, supply conduit 28 and a manifold 29. The purge air is used when liquid fuel is not flowing (for example, when natural gas fuel is being used) to keep the liquid fuel nozzles cool (and thus prevent coking) and to prevent backflow.

In the exemplary but nonlimiting embodiment described herein, the invention relates particularly to an apparatus for use in cooling the three-way purge valve 20. A cooling housing 30 is designed for easy installation about the purge valve 20. Specifically, and with reference also to FIGS. 2 and 3, the housing (or housing body) 30 is comprised of a generally mailbox-shaped (or other suitably-shaped) structure that includes two half-housing portions 32 and 34 that may be separated (and joined) along a seam 36 along the top surface thereof (a similar seam along the bottom surface 38 is not visible). Upstanding tab pairs 40, 42 along the seam edges of the housing portions 32, 34 (top and bottom) permit easy securement of the half-housing portions by means of screws or other appropriate fasteners. A forward end plate 44 and a similar rearward end plate 46 are designed to close the ends of the hollow housing body and, here again, similar tab pairs 48, 50 at respective ends of the housing are employed to secure the end plates 44, 46 to the housing body 30. Of course, other equivalent fastening techniques could be employed.

Figure 3:
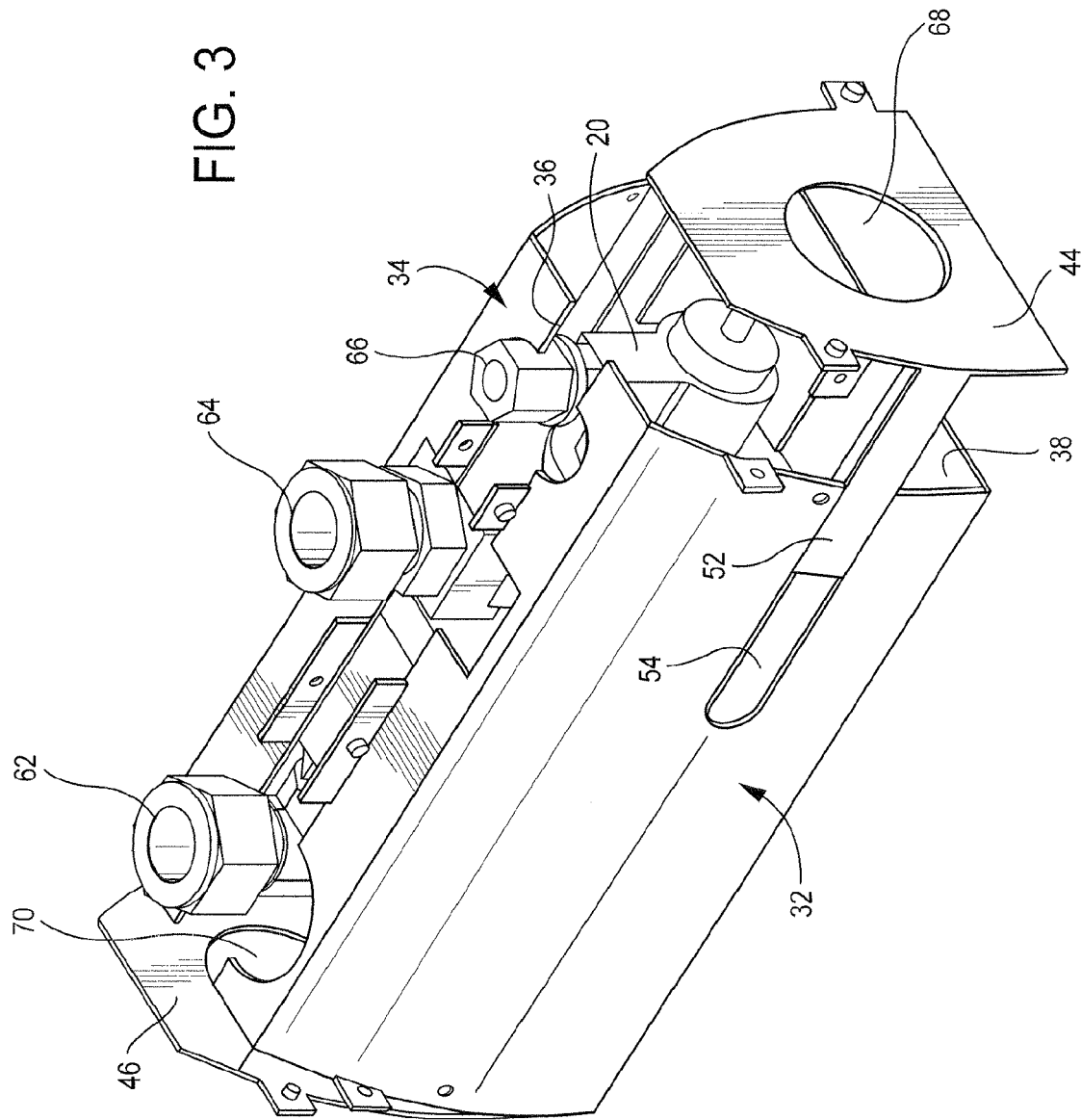
FIG. 3 is a partially exploded view of the housing of FIG. 2, but with a three-way purge valve shown received within the housing.

The forward end plate 44 is also provided with elongated and substantially parallel guide arms 52 (one shown) that are adapted to slide within open slots 54 formed on opposite sides of the housing body 30 and which permit the end plate 44 to be pulled away from the housing body 30 and removed as shown in FIG. 3. Thus, with the end plates 44 and 46 removed, the housing half portions 32, 34 may be opened permitting insertion of a three-way purge valve. It will be appreciated that other arrangements are contemplated, for example, a "piano" hinge could extend along the bottom of the housing, such that housing portions 32, 34 may be pivotably attached along the hinge which would be substantially vertically aligned with the seam 36. In addition, the end plate 46 could also be provided with guide arms similar to guide arms 52 if so desired. Other equivalent guide devices having a similar function could be employed as well.

Figure 2:
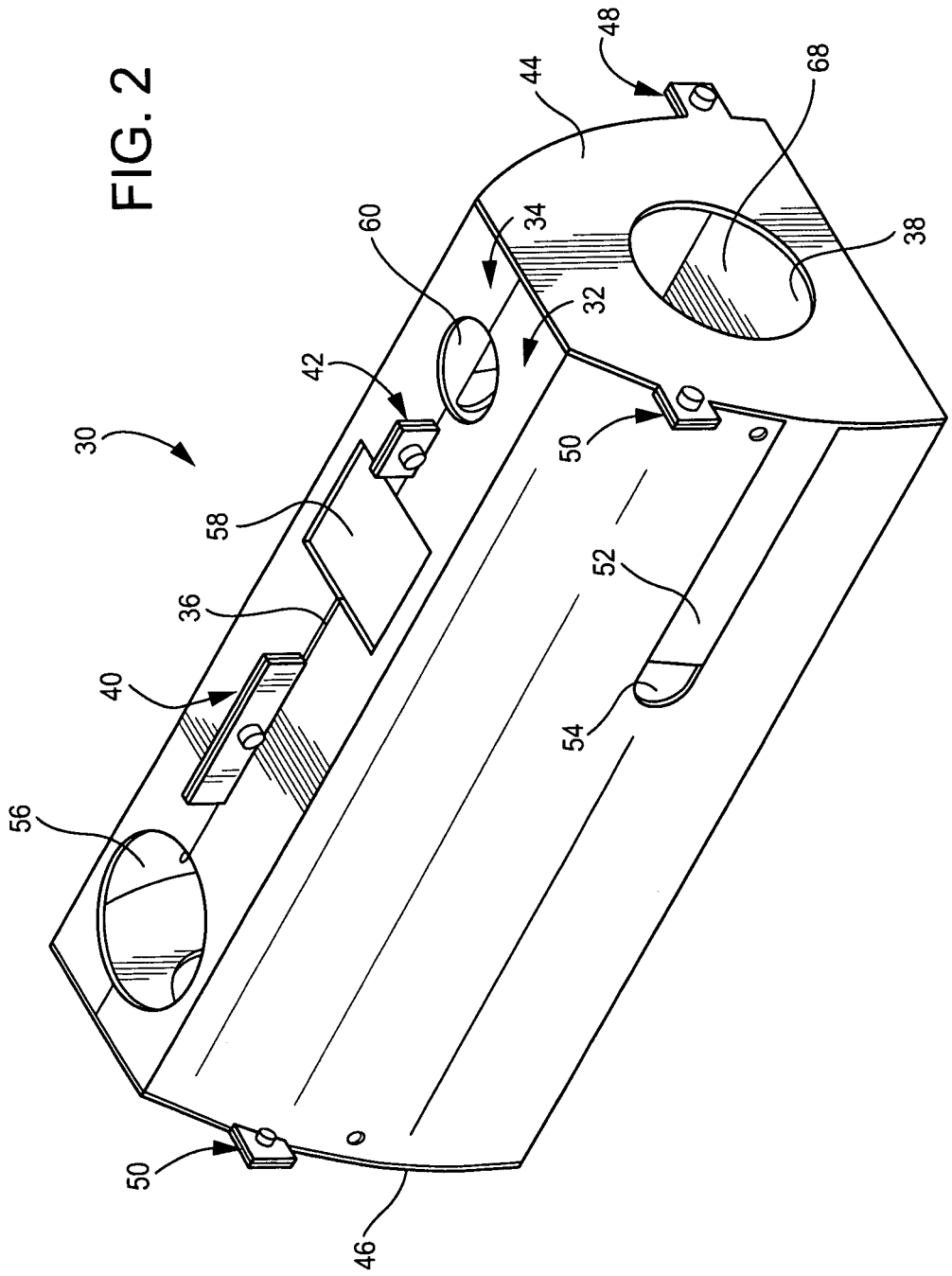
FIG. 2 is a perspective view of a three-way purge valve housing assembly in accordance with an exemplary but non-limiting of the invention.

As shown in FIGS. 2 and 3, the housing may be closed about the purge valve 20, with inlets and/or outlets of the purge valve accommodated by openings or apertures 56, 58 and 60 formed along the seam 36. More specifically, these apertures receive respective fittings 62, 64 and 66 of the purge valve, thus permitting access to the fittings even when the purge valve is enclosed within the housing body 30. The end plate 44 is reattached by aligning the guide arms 52 with the slots 54 and moving the plate axially into the position shown in FIG. 2. The end plates 44, 46 are then reattached using the tab pairs 40, 42 and 48, 50.

A cooling outlet opening 68 is formed in the end plate 44, and a similar cooling inlet opening 70 is formed in the opposite end plate 46. With the purge valve 20 seated within the housing, and with the half-housing portions 32, 34 secured and the forward and rearward end plates 44, 46 firmly in place, cooling air can be supplied to the housing body 30 via inlet opening 70, for example, utilizing a take-off 72 (FIG. 1) to supply compressor air to the housing 30 by means of a cooling air supply conduit 74 connected to the inlet opening 70 such that cooling air flows through the housing 30 to cool the three way purge valve 20, and out of the housing via conduit 76 connected to the outlet opening 68. Alternatively, the purge air may simply exit the outlet opening 68 with no additional piping or conduits required.

Suitable spacers (not shown) of any appropriate size, shape and composition may be used to maintain the purge valve 20 and housing body 30 spaced from each other to facilitate efficient cooling flow through the housing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus comprising:
    a cooling enclosure for a turbine engine valve having liquid fuel flow through the valve, wherein the valve comprises:
    a housing body elongated in an axial direction formed by a pair of half-housing portions and a pair of removable end plates at opposite ends of said elongated housing body, said pair of half-housing portions separable along at least one of a pair of longitudinally-extending seams on respective top and bottom surfaces of said elongated housing body;
    plural tabs on each half-housing portion and each removable end plate that are mated together with fasteners for securing said pair of half-housing portions together and for securing said pair of removable end plates to said pair of half-housing portions to thereby form said housing body;
    wherein each of said removable end plates is provided with a pair of elongated parallel guide arms extending axially beyond said end plate that are adapted to slide within axially-extending elongated open slots formed in said pair of half-housing portions;
    one or more apertures for accommodating a like number of valve fittings; and
    axially-aligned cooling air inlet and outlet openings in said pair of removable end plates for supplying and removing cooling air to said housing body for cooling the valve.

2. The apparatus of claim 1 wherein said pair of half-housing portions are separable also along a second of said pair of longitudinally-extending seams.

3. The apparatus of claim 1 wherein said one or more apertures are located along at least one of said pair of longitudinally-extending seams.

4. An apparatus comprising:
    a cooling enclosure for a turbine engine valve having liquid fuel flow through the valve, wherein the valve comprises:
    a hollow, open-ended housing body elongated in an axial direction and split into two half-housing portions along a pair of aligned seams, said two half-housing portions detachably secured to each other along said pair of aligned seams, and a pair of end plates removably secured to said two half-housing portions of said housing body;
    a cooling air inlet in one of said pair of end plates and a cooling air outlet in the other of said pair of end plates;
    plural tabs on each half-housing portion and each removable end plate that are mated together with fasteners for securing said pair of half-housing portions together and for securing said pair of removable end plates to said pair of half-housing portions to thereby form said housing body;
    wherein at least one of said end plates is formed with a pair of elongated, axially-extending alignment guide arms that slide within respective axially-extending elongated open slots formed in said two half-housing portions, respectively, said axially-extending alignment guide arms extending beyond said at least one end plate.

5. The apparatus of claim 4 wherein said housing body is provided with one or more apertures for accommodating a like number of fittings on the valve.

6. The apparatus of claim 4 wherein at least one set of aligned fastener tabs are provided along said aligned seams, said aligned fastener tabs adapted to receive one or more fasteners.

7. The apparatus of claim 4 wherein said pair of end plates each have one or more fastener tabs aligned with a like number of fastener tabs on said housing body and adapted to receive one or more fasteners.

8. An apparatus comprising:
   a system for cooling a gas turbine fuel component adapted for feeding liquid fuel to at least one combustor located in a high temperature environment to thereby eliminate coking in the fuel component, the system comprising:
   a hollow open-ended housing body elongated in an axial direction and enclosing the fuel component, said open-ended housing body split into two half-housing portions along a pair of aligned seams, said two half-housing portions detachably secured to each other along said pair of aligned seams, and a pair of end plates removably secured to said two half-housing portions of said housing body;
   plural tabs on each half-housing portion and each removable end plate that are mated together with fasteners for securing said pair of half-housing portions together and for securing said pair of removable end plates to said pair of half-housing portions to thereby form said housing body;
   a cooling air inlet in one of said pair of end plates and a cooling air outlet in the other of said pair of end plates, wherein at least one of said removable end plates is provided with a pair of elongated parallel guide arms extending axially beyond said end plate that are adapted to slide within axially-extending elongated open slots formed in said pair of half-housing portions; and
   a cooling air supply conduit connected to said cooling air inlet for supplying cooling air to said housing body for cooling the fuel component.

9. The apparatus of claim 8 wherein the fuel component comprises a purge valve, and wherein at least one aperture is provided along at least one of said seams, adapted to accommodate at least one fitting of said purge valve.

* * * * *